United States Patent
Tanimoto et al.

(10) Patent No.: US 6,251,422 B1
(45) Date of Patent: Jun. 26, 2001

(54) METHOD FOR REDUCING BODY FAT ACCUMULATION IN LIVESTOCK OR POULTRY

(75) Inventors: Hiroyuki Tanimoto; Hitoshi Sato; Masahiko Karasawa, all of Kawasaki; Kazuya Iwasaki, Kuroiso; Akio Oshima, Kuroiso; Sonosuke Adachi, Kuroiso, all of (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 08/945,806

(22) PCT Filed: May 10, 1996

(86) PCT No.: PCT/JP96/01242

§ 371 Date: Nov. 12, 1999

§ 102(e) Date: Nov. 12, 1999

(87) PCT Pub. No.: WO96/35339

PCT Pub. Date: Nov. 14, 1996

(30) Foreign Application Priority Data

May 12, 1995 (JP) .................................................... 7-114602
Apr. 2, 1996 (JP) .................................................... 8-79922

(51) Int. Cl.$^7$ ............................. A23K 1/17; A23K 1/165; A61K 38/00
(52) U.S. Cl. .................................. 424/442; 514/2; 514/12
(58) Field of Search .................................. 424/442, 443; 514/2, 12

(56) References Cited

U.S. PATENT DOCUMENTS 5,447,732  9/1995  Tanimoto et al. ..................... 424/74

OTHER PUBLICATIONS

Biosis abstract, An 1994:107857, Munsiri et al., 1993.*
Kiichi, Preparation of fermented food utilizing waste liquid from steaming and boiling process of soybeans, AN 81–106565 JAPIO, Aug. 1981.*
Tanimoto Hiroyuki et al. Readily absorbable mineral containing composition and food and drink containing the same AN 93–316999 JAPIO, Nov. 1992.*
Shigeru, New Gamma–Polyglutamic acid, production thereof and drink agent containing the same, JAPIO abstract. Pub–No. JP403047087A, 1991.*
Shinji, A–et al., Animal Feed Additive or Feed, AN 83–179439, JAPIO abstract of JP 58179439, Oct. 1983.*

* cited by examiner

Primary Examiner—Minna Moezie
Assistant Examiner—Shengjun Wang
(74) Attorney, Agent, or Firm—Oblon, Spivak, McClelland, Maier & Neustadt, P.C.

(57) ABSTRACT

A feed composition for animals (livestock, poultry, fish or pet) which contains poly-γ-glutamic acid (and/or degraded product thereof) and, a method for reducing body fat acumulation in animals which comprises feeding animals with a feed composition containing poly-γ-glutamic acid.

5 Claims, 1 Drawing Sheet

Ca retention rate

*: P<0.05 vs. Group 1

METHOD FOR REDUCING BODY FAT ACCUMULATION IN LIVESTOCK OR POULTRY

This application is a 371 of PCT/JP96/01242 filed May 10, 1996.

TECHNICAL FIELD

The present invention relates to a feed composition for reducing body fat accumulation. More particularly, it relates to a feed composition for reducing body fat and increasing carcass yield in livestock or poultry which contains poly-γ-glutamic acid and/or degraded products thereof.

BACKGROUND ART

Feeds contain proteins, carbohydrates, fats, minerals, and vitamins. In general, defatted soybeans, fish meal, meat bone meal, rapeseed cake and the like are employed as the protein sources; corn, wheat flour and the like as the carbohydrate sources; animal and vegetable fats as fat sources. Among mineral sources, calcium carbonate, calcium phosphate, pulverized shell and the like are employed as the calcium sources; and ferric chloride, ferrous sulfate and the like as the iron sources.

Large energy intake for promotion of livestock and poultry growth tends to result in increased body fat content in their animals. However, because people have become more health conscious and try to reduce intake of animal fat, it is widely demanded to develop a breeding method or a feed to produce animals with less body fat.

As examples of feed for livestock and poultry which makes body fat content reduced, Japanese Patent Unexamined Publication No. HEI 03-219838 discloses that valine, leucine and isoleucine as amino acid components are blended into a feed at 0.01~3.00% by weight, respectively. And, Japanese Patent Publication No. HEI 06-95892 discloses that vitamin $D_3$ is blended or mixed into a feed at 750~2500 μg per kg of feed.

There is poly-γ-glutamic acid, the main component of a viscous substance of femented soybeans called natto in Japan, as a substance which is capable of solubilizing minerals in the intestinal tract and which accelerates absorption of minerals. Poly-γ-glutamic acid has an ability to solubilize minerals owing to its many carboxyl groups present in the molecules. Furthermore, poly-γ-glutamic acid is considered to maintain its activity even in the intestinal tract because it is combined with γ-peptide bond which remains unhydrolyzed with digestive enzymes present in the small intestine. Foods and beverages containing poly-γ-glutamic acid are known (Japanese Patent Unexamined Publication Nos. HEI 03-30648 and HEI 05-316999). While any feed for reducing body fat which contains poly-γ-glutamic acid has not been known yet.

An object of the present invention is to develop a feed composition which can reduce the amount of body fat in livestock and poultry, especially abdominal fat.

DISCLOSURE OF INVENTION

The present inventors have investigated in order to achieve the above object, and found that when poly-γ-glutamic acid is added to a feed for livestock or poultry, the absorption of minerals in the intestinal tract is accelerated and thereby the formations of bone and eggshell are promoted, and further the accumulated amount of body fat is reduced with increased carcass yield of livestock and poultry. The present invention was completed based on this finding.

That is, the present invention is a feed composition containing poly-γ-glutamic acid as a substance to reduce body fat.

THE BEST MODES FOR CARRYING OUT INVENTION

Figure 1:
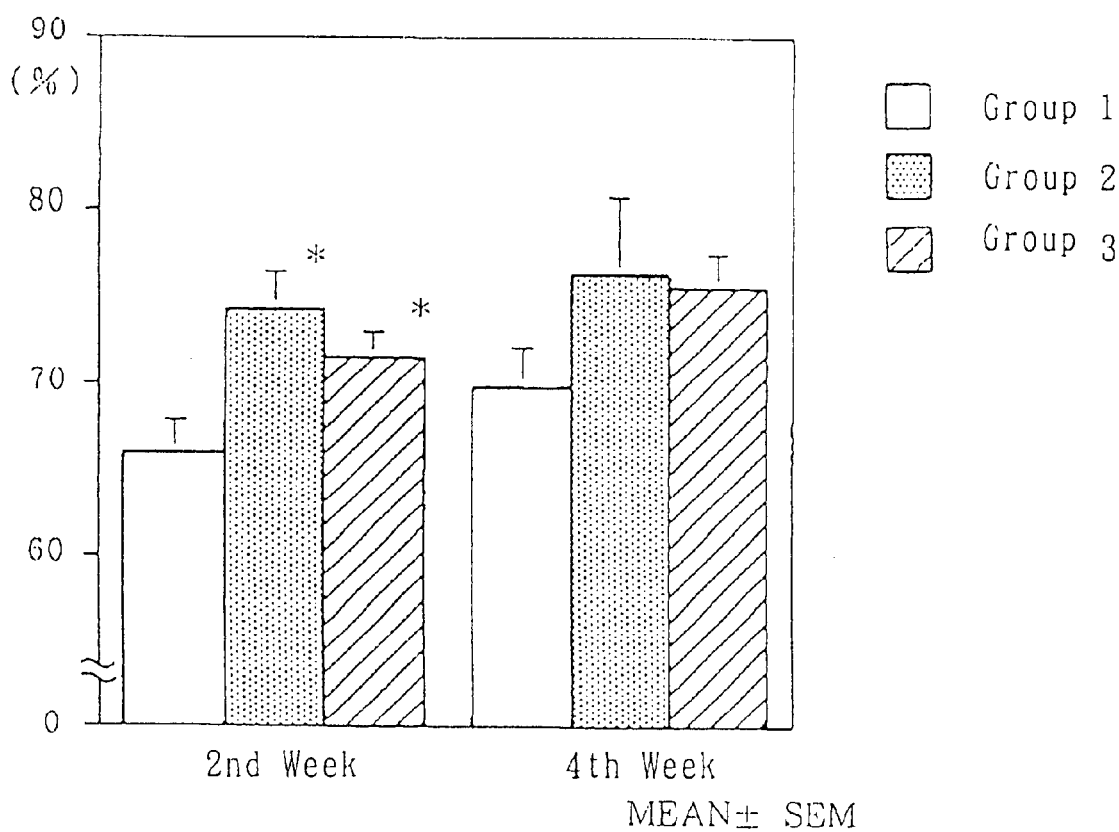
FIG. 1 is a graph showing calcium retention rate in example 10.

The poly-γ-glutamic acid to be used in the present invention may be poly-γ-glutamic acid extracted from the viscous substance of natto, or it may be poly-γ-glutamic acid secreted extracellularly from bacteria belonging to the genus Bacillus, such as *Bacillus natto*, etc. Also, it may be used not only in its purified form but also in partially purified form. Therefore, there is absolutely no problem with including the levan contained in the natto viscous substance secreted extracellularly by *Bacillus natto*.

As to an average molecular weight of the poly-γ-glutamic acid to be used in the present invention, there is no limitation. Usually, the poly-γ-glutamic acid which may be separated from natto or a fermentated broth of *Bacillus natto* has an average molecular weight ranging from 1,000 to 3,000,000. Also, the average molecular weight of poly-γ-glutamic acid degraded product lies in the range of from 1,000 to 1,000,000. It is preferable to use poly-γ-glutamic acid having an average molecular weight of 10,000 to 1,000,000.

It is said that poly-γ-glutamic acid is generally a mixture of D- and L-forms and that the ratio of D-form to L-form may be varied depending on the kind of microorganism or the culture composition. For example, poly-γ-glutamic acid disclosed in Japanese Patent Unexamined Publication No. HEI 03-47087 contains more than 90% of L-form. The poly-γ-glutamic acid which may be used in the present invention is not restricted in the D/L ratio. There may be used poly-γ-glutamic acid in any ratio of D-form to L-form.

For the production of poly-γ-glutamic acid having the desired molecular weight, there is a method whereby the molecular weight of poly-γ-glutamic acid having a molecular weight higher than that desired is lowered by an acid or by bacteria or enzymes derived from organ, which can hydrolyze-γ-bonds, and a method whereby poly-γ-glutamic acid having the desired molecular weight is secreted by culturing *Bacillus natto*, etc. However, there is no difference with using poly-γ-glutamic acid in either way.

Poly-γ-glutamic acid is usually obtained as a sodium salt, but there is no difference with using its other edible salts or the free poly-γ-glutamic acid.

The amount added of poly-γ-glutamic acid ingredient to feeds may be about 0.01~3% by weight, preferably about 0.01~1% by weight.

The feed of the present invention may be utilized for livestock such as cattle, pig, horse and the like, and poultry such as chicken, turkey, duck, quail and the like.

The other components of the feed composition may be the same as the ordinary feed for the intended animal, and include proteins, carbohydrates, fats, minerals, vitamins and the like. The calcium content in the feed composition may be about 0.01~30% by weight, preferably about 0.1~5% by weight. The iron content in the feed composition may be about 0.001~1% by weight, preferably about 0.005~005% by weight.

The feed composition of the present invention may be manufactured according to the conventional process, and the poly-γ-glutamic acid may be blended together with other feed components, or blended separately.

The feeding method of the feed composition to the intended animal may also be conventional.

EXAMPLE 1

[Preparation of poly-γ-glutamic acid]

*Bacillus natto* separated from commercially available natto was inoculated into a culture medium (pH 6.0) containing 0.3% of malt extract, 0.3% yeast extract, 0.5% of polypeptone and 1.0% of glucose and precultured at 32° C. for 24 hours with 3 liters of mini jar. And then, the preculture medium was added in a concentration 0.5% to a main culture medium (pH 6.4) containing 7.5% of glucose, 1.5% ammonium sulfate, 0.035% of $MgSO_4 \cdot 7 H_2O$, 0.005% of $MnSO_4 \cdot nH_2O$, 0.15% of $KH_2PO_4$, 5.0% of monosodium glutamate and 1.0% of NaCl and the medium was cultivated at 37° C. for 48 hours with 500 liters of jar.

The obtained culture medium was adjusted to pH 2.0 with concentrated hydrochloric acid, and thereafter was subjected to centrifugation or filter press. To the supernatant thereof was added NaCl so as to become 10% whereby poly-γ-glutamic acid precipitated. About 12 kg of crude poly-γ-glutamic acid fraction was dissolved in 120 liters of diluted aqueous sodium hydroxide solution and a solution (pH 4.0) was subjected to decoloring with activated charcoal and then to desalting by ultrafiltration, and neutralized with diluted aqueous sodium hydroxide solution. The solution was spray-dried to obtain 2.5 Kg poly-γ-glutamic acid as the sodium salt. The molecular weight of the obtained poly-γ-glutamic acid was measured with a low angle laser light scattering meter (LALLS: Tosoh LS8000) and found to be 520,000.

EXAMPLE 2

[Preparation of degradated products of poly-γ-glutamic acid]

The poly-γ-glutamic acid prepared in Example 1 was dissolved in water to a concentration of 2 mg/ml, and the solution was adjusted to pH 1 with hydrochloric acid, and then heated at 50° C. for 30 minutes or at 70° C. for a hour. After heating, the respective solutions were cooled to room temperature and neutralized with aqueous sodium hydroxide solution, dialysed against water and spray-dried. The molecular weights of the resulting poly-γ-glutamic acid degradated products were measured by LALLS, and found to be 300,000, 10,000 respectively.

The present invention is further illustrated in details by the following Examples using the poly-γ-glutamic acid prepared in Examples 1 and 2.

EXAMPLE 3

[Preparation of feed composition for pig]

The components shown below were blended to prepare feed composition for a young pig.

| | |
|---|---|
| Corn | 50% by weight |
| Milo | 23 |
| Barley | 13 |
| Soybean cake | 16 |
| Rapeseed cake | 4 |
| Fish meal | 2 |
| Rice bran | 2.6 |
| Sodium chloride | 0.3 |
| Mineral mix*[1] | 0.1 |
| Vitamin mix*[2] | 0.1 |
| Calcium phosphate | 0.8 |

-continued

| | |
|---|---|
| Calcium carbonate | 0.8 |
| Poly-γ-glutamic acid (average molecular weight of 10,000) | 0.3 |

Note:
*[1]Bitamin mix is composed of vitamin A, vitamin D, vitamin E, vitamin K, thiamin, riboflavin, pantothenic acid, niacin, vitamin $B_6$, choline, vitamin $B_{12}$, biotin folic acid.
*[2]Mineral mix is composed of calcium, phosphorus, sodium, chloride, potassium, magnesium, iron, zinc, manganese, copper, iodine, selenium.

The calcium content in the feed composition for a young pig was 0.55% by weight.

EXAMPLE 4

[Preparation of feed composition for egg-producing chicken]

The components shown below were blended to prepare feed composition for egg-producing chicken.

| | |
|---|---|
| Corn | 50% by weight |
| Milo | 11 |
| Soybean cake | 14 |
| Fish meal | 3 |
| Corn gluten meal | 2 |
| Rapeseed cake | 2 |
| Meat bone meal | 4 |
| Rice bran | 7.3 |
| Sodium chloride | 0.3 |
| Animal fat | 2.0 |
| Mineral mix*[1] | 0.1 |
| Vitamin mix*[2] | 0.1 |
| Calcium carbonate | 3.5 |
| Calcium phosphate | 0.5 |
| Poly-γ-glutamic acid (an average molecular weight of 10,000) | 0.2 |

Note:
*[1]and *[2]: See Example 3

The calcium content in the feed composition for egg-producing chicken was 3.4% by weight.

EXAMPLE 5

[Preparation of feed composition for chicks]

The components shown below were blended to prepare feed composition for chicks.

| | |
|---|---|
| Corn | 50% by weight |
| Milo | 14 |
| Soybean cake | 23 |
| Fish meal | 4.8 |
| Rapeseed cake | 3 |
| Meat bone meal | 2 |
| Sodium chloride | 0.3 |
| Animal fat | 1.0 |
| Mineral mix*[1] | 0.1 |
| Vitamin mix*[2] | 0.1 |
| Calcium carbonate | 0.5 |
| Calcium phosphate | 1.0 |
| Poly-γ-glutamic acid (an average molecular weight of 10,000) | 0.2 |

Note:
*[1] and *[2]: See Example 3

The calcium content in the feed composition for chicks was 0.9% by weight.

EXAMPLE 6

[The breeding test of the feed composition to egg-producing chickens]

One hundred egg-producing chickens of 450 days old were divided into 2 groups, i.e. treatment group and control group, each of which consisted of 50 chickens. The treatment group was fed with the feed composition prepared in Example 4 for 20 days. The control group was fed in the same manner as the treatment group with control feed composition not blended with poly-γ-glutamic acid. The eggshell strength of the eggs produced in the five days before ending the test was measured, and compared with those produced in the five days before starting test. The results are shown in Table 1.

TABLE 1

| | Eggshell Strength (kg) | |
|---|---|---|
| Feed Composition | Before starting the Test | Before ending the Test |
| Control | 3.38 ± 0.08 (100) | 2.90 ± 0.08 (86[#]) |
| Example 4 | 3.29 ± 0.07 (100) | 3.15 ± 0.09* (96) |

MEAN ± SEM
*indicates $P < 0.01$ vs. Control
[#]indicates relative value calculated as the eggshell strength measured before test rendered 100

EXAMPLE 7

[The breeding test of the feed composition to chicks]

Thirty chicks of 0 day old were divided into 2 groups each consisted of 15 chicks. One group was fed with the feed composition prepared in Example 5, and the other group was fed with the control feed composition not blended with poly-γ-glutamic acid. Both groups were fed for 10 days.

The thighbone weight and the calcium content (%) in the thighbone were measured. The results are summarized in Table 2.

TABLE 2

| Feed Composition | Thighbone Weight (g) | Ca Content in Thighbone (%) |
|---|---|---|
| Control | 0.617 ± 0.014 | 5.36 ± 0.12 |
| Example 5 | 0.659 ± 0.015* | 5.73 ± 0.13* |

MEAN ± SEM
*indicates $P < 0.05$ vs. Control

It was confirmed by Examples 6 and 7 that poly-γ-glutamic acid has effects of accelerating absorption of calcium in the intestinal tract and the formation of bone.

EXAMPLE 8

[The feed composition for broiler chicks for the preliminary stage]

The components shown below were blended to prepare the feed composition for broiler chicks for the preliminary stage.

| | |
|---|---|
| Corn | 54.6% by weight |
| Soybean cake | 32 |
| Fish meal | 2 |
| Meat bone meal | 2 |
| Animal fat | 5 |
| Calcium carbonate | 0.5 |
| Calcium phosphate | 0.2 |
| Sodium chloride | 0.2 |
| Vitamin mix*[1)] | 0.1 |
| Mineral mix*[2)] | 0.1 |
| L-Lysine hydrochloride | 0.1 |
| DL-Methionine | 0.1 |
| Poly-γ-glutamic acid (average molecular weight of 300,000) | 0.2 |

Note:
*[1)] and *[2)]: See Example 3

The calcium content in the feed composition for the broiler chicks for the preliminary stage was 0.95% by weight.

EXAMPLE 9

[The feeding test of the feed composition to broiler chicks]

One hundred and eighty male broiler chicks of 7 days old were divided into 2 groups, each consisted of 90 broiler chicks. One group was fed for 14 days with the feed composition prepared in Example 8. The other group was fed for 14 days with the control feed composition not blended with poly-γ-glutamic acid. Thereafter, both groups were fed with commercial feed containing no poly-γ-glutamic acid up to 55 days old. At the end of the feeding period, the body weight, feed requirement, length of the crural bone, carcass yield and the abdominal fat were measured. The results are shown in Table 3.

TABLE 3

| Feed Composition | Body Weight of 55 Days Old (g) | Feed Requirement | Length of the Crural Bone (cm) | Yield of the Breast Meat [A] (%) | Yield of Thigh Meat [B] (%) | Carcass yield [A] + [B] (%) | Abdominal fat (%) |
|---|---|---|---|---|---|---|---|
| Control | 3.353 | 1.946 | 12.5 | 17.55 | 21.83 | 39.38 (100) | 3.6 (100) |
| Example 11 | 3.400 | 1.923 | 12.8* | 17.80 | 22.49 | 40.29[#] (102.3) | 2.8[#] (77.8) |

*indicates $P < 0.05$ vs. the Control
[#]indicates relative value calcurated as the control was rendered 100.

It is apparent from the feeding results shown in Table 3 that poly-γ-glutamic acid promotes the formation of bone, especially the crural bone significantly, and causes an effect of reducing body fat as well as the increased carcass yield.

INDUSTRIAL APPLICABILITY

The present invention relates to a feed composition containing poly-γ-glutamic acid as a substance to reduce body fat accumulation. When the feed composition is fed to livestock or poultry, effects of reducing body fat and increasing carcass yield are expected in addition to effect of increasing mineral absorption in the intestinal tract, thus causing effects to prevent the formation of weak or deformed legs in livestock and poultry and to prevent the lowering of egg-shell strength in egg-producing chickens.

What is claimed is:

1. A method for reducing body fat accumulation in livestock or poultry in need thereof which comprises feeding said livestock or poultry a feed composition comprising poly-γ-glutamic acid and/or a degradation product thereof, wherein said degradation product comprises poly-γ-glutamic acid having an average molecular weight of 1,000–1,000,000 to reduce body fat accumulation in said livestock or poultry.

2. The method as claimed in claim 1 wherein said feed composition contains 0.01 to 3% by weight of poly-γ-glutamic acid and further contain 0.01 to 30% by weight of calcium.

3. The method as claimed in claim 1 wherein an average molecular weight of said poly-γ-glutamic acid lies in the range of from 10,000 to 1,000,000.

4. The method as claimed in claim 1 wherein said poultry is an egg-producing chicken or a broiler chick.

5. The method as claimed in claim 1, comprising feeding said composition to a pig, chicken or turkey.

* * * * *

UNITED STATES PATENT AND TRADEMARK OFFICE
CERTIFICATE OF CORRECTION

PATENT NO. : 6,251,422 B1
DATED : June 26, 2001
INVENTOR(S) : Tanimoto et al.

Page 1 of 1

It is certified that error appears in the above-identified patent and that said Letters Patent is hereby corrected as shown below:

<u>Title page,</u>
Item [86], the Filing Date should read:

[86] PCT No.: PCT/JP96/01242

§ 371 date: Nov. 12, 1997
§ 102(e) Date: Nov. 12, 1997

Signed and Sealed this

Eighth Day of January, 2002

Attest:

Attesting Officer

JAMES E. ROGAN
*Director of the United States Patent and Trademark Office*